March 3, 1970 — R. R. ROTH — 3,498,387
FIELD CONDITIONER

Filed Sept. 27, 1967

INVENTOR.
ROBERT R. ROTH
BY
John C. Thompson
ATTORNEY

March 3, 1970 R. R. ROTH 3,498,387
FIELD CONDITIONER
Filed Sept. 27, 1967 4 Sheets-Sheet 3

INVENTOR.
ROBERT R. ROTH
BY
*John C. Thompson*
ATTORNEY

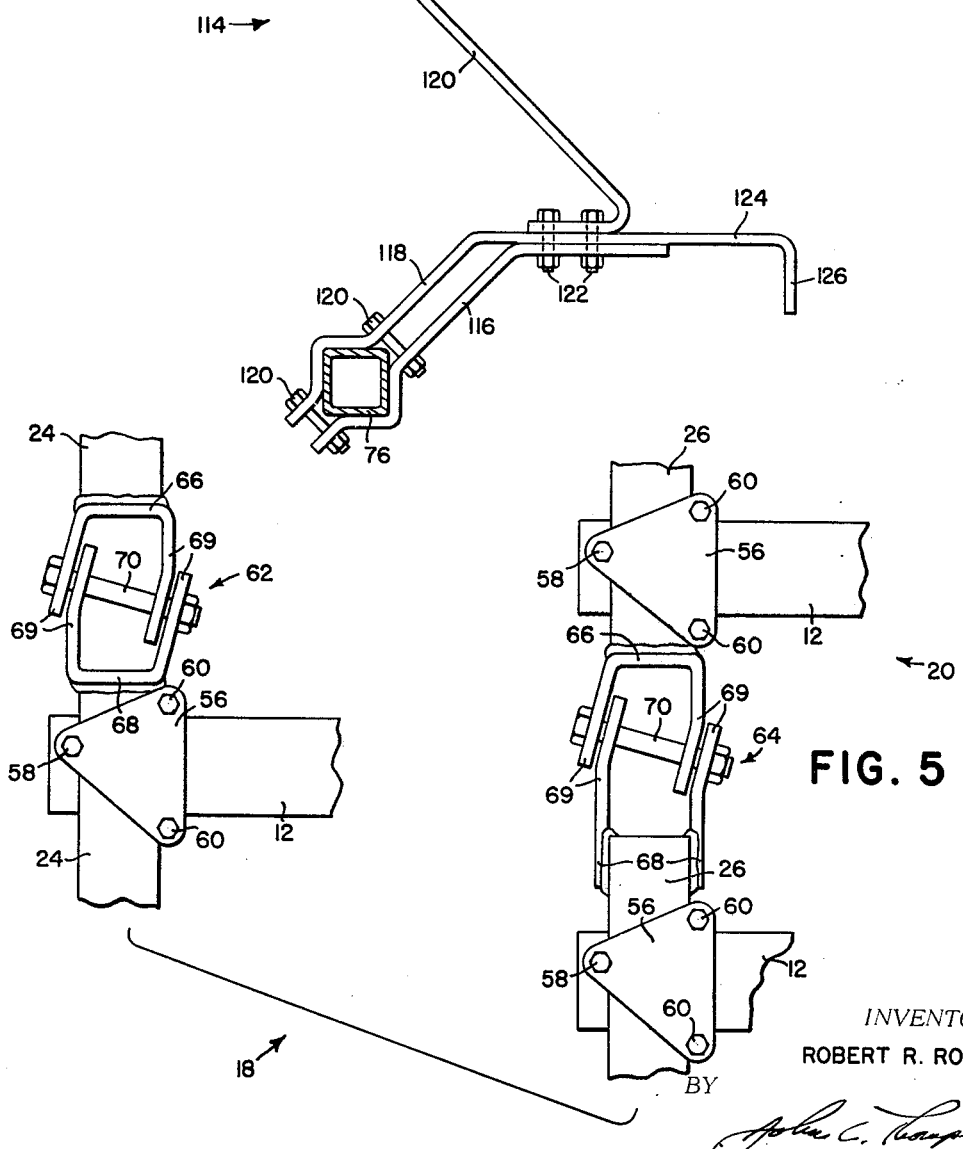

United States Patent Office 3,498,387
Patented Mar. 3, 1970

3,498,387
FIELD CONDITIONER
Robert Richard Roth, Rock Island, Ill., assignor to Deere & Company, Moline, Ill., a corporation of Delaware
Filed Sept. 27, 1967, Ser. No. 670,993
Int. Cl. A01b 63/102, 65/06, 35/06
U.S. Cl. 172—456
5 Claims

ABSTRACT OF THE DISCLOSURE

An agricultural implement having a center section and pivoted outrigger sections, all of the sections being shiftable by hydraulic means about a transverse axis from a normal working position to a field transport position, and subsequently about upwardly and rearwardly extending axes to a folded transport position.

Field of the invention

This invention relates generally to agricultural implements, and more particularly to carrying frames for earth-working devices and the like.

Description of the prior art

In recent years as farm tractor horsepower has increased, it has become common practice to extend the width of tools used with the modern tractors. However, as the width of the implements has increased, it has become necessary to provide means for transporting these implements from one field to another over public highways. One form of implement carrier, which has enjoyed considerable commercial success is that shown in the Kopaska U.S. Patent No. 2,970,658. A slightly different form of the Kopaska device has front and rear transversely extending tool bars to which a plurality of spring tooth cultivators are secured. In all of these devices, the outer sections are secured to the inner section about a forwardly extending axis. While these machines are commercially successful, certain disadvantages are present from their design, these being that there is no stable folded position for the outrigger sections, that it is necessary to lift the outrigger sections onto a transport stand manually, and that the sections tend to buckle upwardly during field operations.

Summary of the invention

It has been found that all of the foregoing disadvantages can be overcome by the expedient of hinging the outrigger sections to the center section about forwardly diverging horizontal axes.

It is the principal object of this invention to provide an implement carrier having an implement supporting frame movable about a transverse axis and outrigger sections secured to an inner section wherein the disadvantages of the prior art devices are overcome by employing forwardly diverging hinge axes between the outrigger and inner sections.

Another object of the present invention is to provide an implement carrier which can be moved from its normal working position to a folded transport position with a minimum of effort.

A still further object of the present invention is to provide an implement carrier that can be transported in its folded transport position in greater safety.

These and other objects and advantages of this invention will be apparent to those skilled in the art after a consideration of the following detailed description, taken in conjunction with the accompanying drawings in which the preferred form of this invention is illustrated.

Brief description of the drawings

FIG. 4 is a side view of the transport support.

FIG. 5 is a plan view of the right-hand hinge.

In the following description right-hand and left-hand reference is determined by standing to the rear of the field conditioner and facing the direction of travel.

Description of the preferred embodiment

Figure 2:
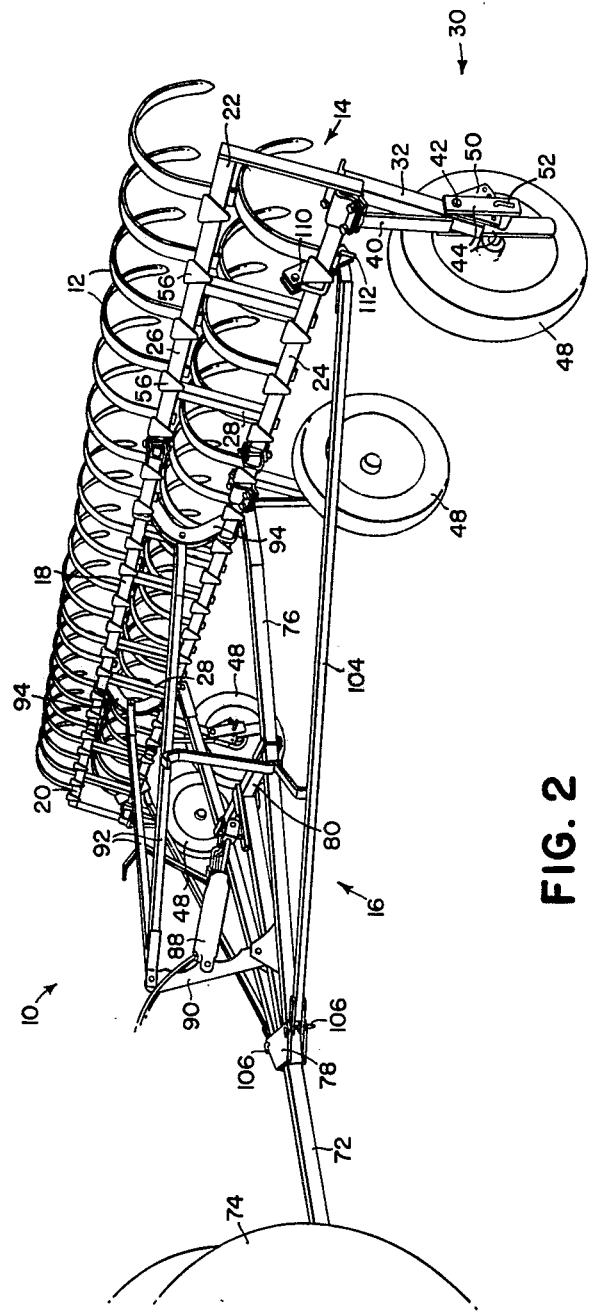
FIG. 2 is a perspective view showing the implement carrier in its field transport position with the implement supporting frame sections rotated to their upwardly and readwardly extending transport position.

Referring first to FIG. 2 in which a field conditioner shown in its field transport position, the field conditioner is formed from an implement carrier, indicated generally at 10, to which a plurality of earth-working devices 12, in the form of spring teeth, are secured. The implement carrier has an implement supporting frame indicated generally at 14, and a draft frame, indicated generally at 16.

The implement supporting frame 14 is provided with a center frame section 18 and right- and left-hand outrigger frame sections 20 and 22 respectively. Each of the frame sections is formed with front and rear transversely extending tool bars 24 and 26 which are interconnected by longitudinally extending spacer bars 28.

Figure 3:
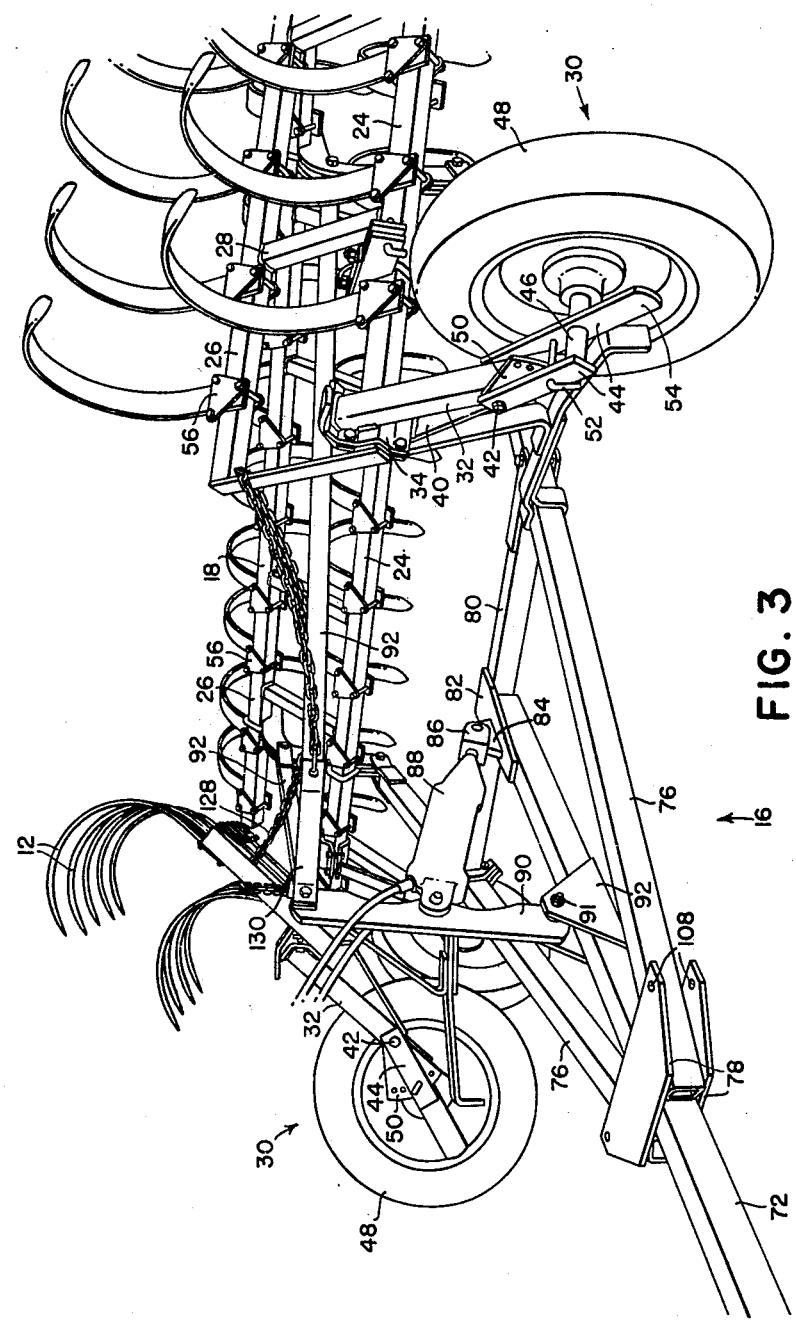
FIG. 3 is a perspective view showing the implement carrier in its fully folded transport position.

The outer end of each of the sections is supported by depth gaging wheel means indicated generally at 30. Each wheel means includes a forwardly extending arm 32 having welded on its rear end a clamping bracket 34 which is disposed to the forward and lower side of the front tool bar 24. A cooperating clamp bracket 36 (FIG. 1) is disposed about the upper and rearward side of the tool bar 24 and is secured to the clamping bracket 34 by means of fasteners 38. A brace and slide plate 40 is secured to the upper forward end of the clamping bracket 34 at its rear end and to a forward portion of the arm 32. A pivot pin 42 (FIGS. 2 and 3) is journaled for rotational movement within a forward portion of the arm 32 and has rigidly secured to it forwardly extending spaced apart arms 44 which carry an axle 46 on which a wheel 48 is journaled for rotation. A suitably apertured sector plate 50 is secured to the arm 32 forwardly of the pivot 42. A removable pin 52 is disposed within aligned apertures in each pair of the arms 44 and also through a suitable aperture in each of the plates 50. One of the arms 44 is provided with an extended portion 54 to facilitate placement of the wheel 48 when the pin 52 is being placed within its desired aperture. By placing the pin in selected apertures, the working depth of the earth-working tools is easily changed.

The earth-working tools are secured to the front and rear tool bars 24, 26 by means of two spaced apart triangular plates 56 which are secured to each other by fasteners. The forward fastener 58 (which is a conventional nut and bolt assembly) passes through an aperture in the tool 14 and abuts against the forward edge of the associated tool bar. The rear fasteners 60 (also in the form of conventional nuts and bolts) are disposed to either side of the tool 12.

The outrigger frames 20, 22 are secured to the center frame 18 by hinge means which define a forwardly and outwardly extending axis. Referring now more particularly to FIG. 5 which shows the hinged interconnection between the center frame 18 and the right outrigger frame 20, the hinge is formed of front and rear hinge assemblies 62, 64, respectively. Each hinge assembly is formed of right and left members 66, 68 having front and rear leg portions 69, the leg portions of each member having spaced apart aligned apertures through which a pivot bolt assembly 70 may be disposed. The leg portions and the apertures are so disposed that they are at an angle, preferably 15° for the legs and 75° for the center line of the apertures with respect to the center line of the transversely extending tool bars 24, 26. The two assemblies 62, 64 are in alignment so that the center line of the hinge pin of the forward member will pass through the center line of the hinge pin of the rear member.

Figure 1:
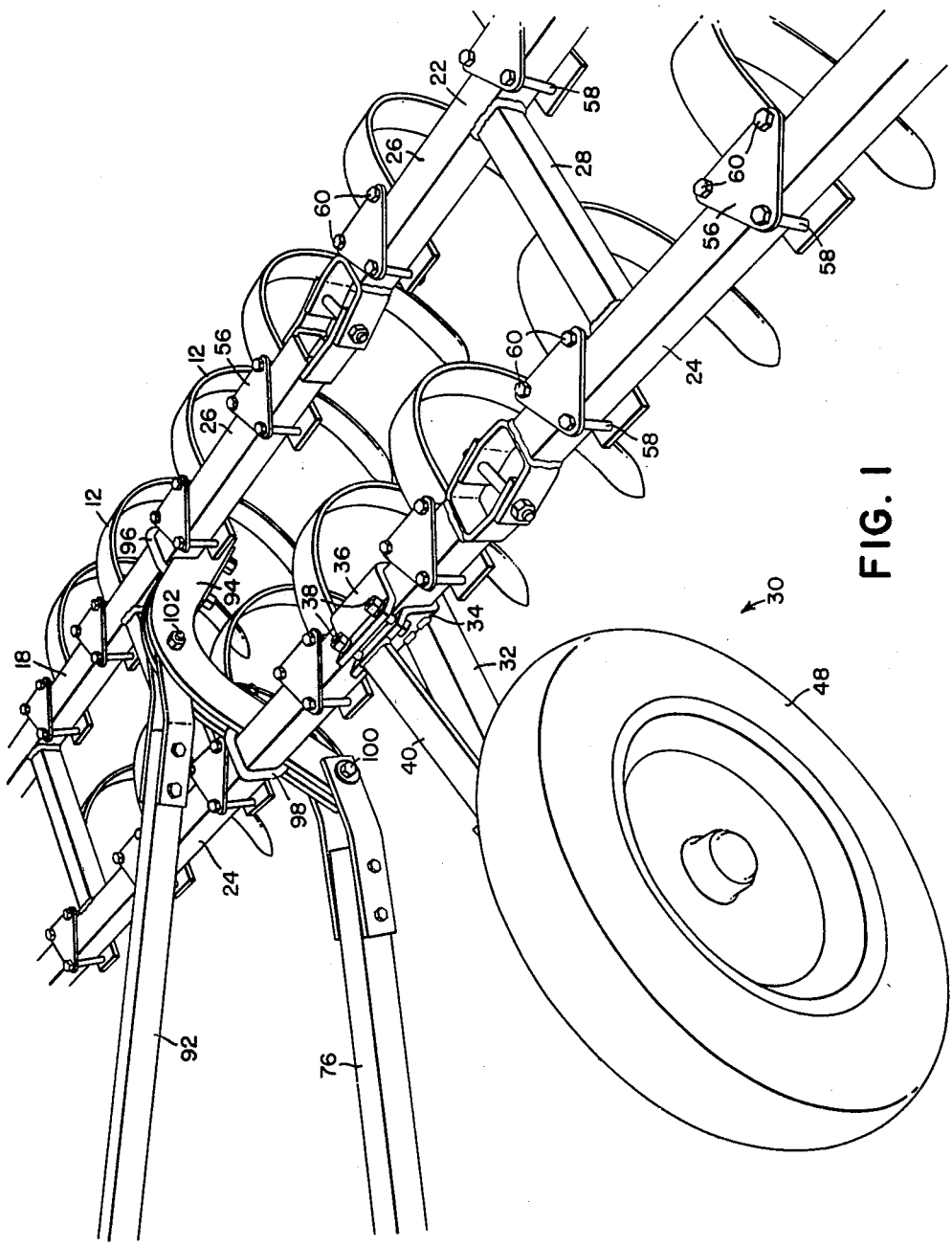
FIG. 1 is a perspective view showing a portion of the implement carrier of this invention in its normal working position.

The draft frame 16 has a longitudinally extending main draft beam 72 having a clevis (not shown) on its forward end which may be secured to the drawbar of a farm tractor 74 or the like. Two forwardly converging members 76 are secured to an intermediate portion of the draft beam 72 by two gusset plates 78. A bracing member 80 is bolted at either end to an intermediate portion of the members 76 to hold their rear ends in spaced apart relation. A plate 82 (FIG. 3) is bolted to the upper surface of the rear end of the draft beam 72 and to an intermediate portion of the brace 80 and has welded on an upper surface an apertured lug 84 to which the rod end 86 of a hydraulic cylinder assembly 88 may be secured. An arm 90 is secured at its lower end by means of a pivot bolt 91 to two spaced apart members 92 which are in turn bolted to a portion of the draft beam 72 between the gusset plates 78 and the plate 82. An intermediate portion of the arm 90 is secured to the anchor end of the cylinder assembly 88 and an upper portion of the arm 90 is apertured and rearwardly extending links 92 are pivotally secured thereto. Two inverted generally U-shaped assemblies 94 (formed from two spaced apart members) are secured to the right- and left-hand ends of the center section 18, the rear leg of each assembly being secured to the rear tool bar by a U-bolt assembly 96, and an intermediate portion of the forward leg of each assembly being secured to the forward tool bar 24 by another U-bolt assembly 98. The lower forward end of each of the spaced apart members of the U-shaped assembly 94 is suitably apertured and is secured to the rear end of the members 76 by transversely extending pivot bolts 100 (FIG. 1). The bight portion of each of the U-shaped members is also suitably apertured and is interconnected with the rear end of the link 92 by pivot bolts 102.

In addition to the converging draft members 76, additional draft members 104 are provided for use when the frame is in its extending position shown in FIGS. 1 and 2. The forward ends of the draft members 104 are apertured and pins 106 are disposed within the apertures of the members 104 and aligned apertures 108 in the gusset plates 78. The rear ends of the members 104 are pivotally secured to brackets 110 on the outer sections 20, 22 by removable pins 112, the pins defining a pivot axis in alignment with the axis of the pins 100.

During normal field conditioning operations, the structure is disposed in the manner illustrated in FIG. 1 with the cylinder 88 in its retracted position. The pins 52 are placed in the desired aperture with the sector plate 50 to gauge the working depth, and the additional draft members 104 are secured at their forward end to the gusset plates 78 and at their rear ends to the brackets 110. In this position, field conditioning operations may be performed. When it is desired to dispose the field conditioner in its field transport position shown in FIG. 2, it is only necessary to extend the cylinder 88 which will pull on the center and outrigger sections 18, 20 and 22 through arm 90 and links 92 causing them to pivot about the transverse axis defined by the bolts 100 and the pins 112 to a position where they are at an angle of about 75° to the horizontal. If it is then desired to resume the field working position, it is only necessary to retract the cylinder 88. However, if it is desired to transport this device over a highway or through narrow gates, the conditioner is placed in its folded transport position shown in FIG. 3. It should be observed that when the conditioner is in its field transport position, the hinge means for the outriggers are so disposed that if their axes were extended upwardly and rearwardly, they would converge.

To place the conditioner in its folded transport position from its field transport position, it is necessary to first remove the pins 106 and 112 and disconnect the additional draft bars 104 from the rest of the structure. It is now possible to roll the outrigger sections 20 and 22 to a forward folded position. It is necessary when folding the outer sections to fold past a "hump" at an angle of about 30° from the starting field transport position. It should be noted at this point that if the structure were entirely rigid when swinging the outrigger sections forwardly, it would actually be necessary to raise the outer wheels 48 off the ground a slight amount against the force of gravity until they pass the "hump" point at which time the outriggers will then advance under the force of gravity toward the ground until they assume a position where they are in an approximately straight ahead position. In practice there is some flexibility in the implement, and as the outer wheels are advanced forwardly towards the "hump," weight is transferred from the outer wheels towards the inner wheels, due to a further pivotal movement of the center section about pivots 100. Once the outer wheels are moved forwardly past the "hump," the weight will be transferred back to the outer wheels, and the outer sections will tend to assume, due to the force of gravity, a normal position where the outer sections are approximately at right angles to the center section.

After the outer sections have swung to a right angle position, if the cylinder 88 is then retracted slightly, the weight will be taken off the outer wheels and the outrigger sections will continue to swing under the force of gravity inwardly towards each other until the wheel assembly 30 contacts the transport supports 114.

Each of the transport supports, best shown in FIG. 4, includes a lower clamping member 116, an intermediate clamping and support member 118, and an upper hook member 120. The members 116 and 118 are bolted to each other by bolts 120 about the members 76. The hook member is in turn secured to these members in any suitable manner as for example by bolts 122. The intermediate member 118 is provided with a generally horizontally disposed surface 124 which serves to support the outrigger sections when they are in their fully folded transport position, and an outer depending stop portion 126.

As the cylinder 88 is retracted further, the wheel assembly 30 will then slide upwardly over the stop 126, along the member 124 (due to the force of gravity), and possibly up along the member 120 until it contacts the hook portion which limits additional movement. If the pressure is then relieved within the cylinder 88, the members will stay upon the horizontal member 124 and tight against the member 120 with the outer wheels 48 out of contact with the surface of the ground. While the outer members 20, 22 will, due to the force of gravity, stay on the horizontal member in their fully folded position, as an additional safety precaution, a chain 128 is provided which is looped through the outrigger sections and secured to a chain securing bracket which extends outwardly from the links 92.

When the field conditioner is in its fully folded position, the members 104, which have previously been removed, may be pinned to the forward clevis (not shown) and so disposed that their rear ends are supported by the rear tool bar 26 of the center section 18.

To position the field cultivator in its ground-working position from its fully folded field transport position, it is only necessary to remove the chain 128, fully extend the cylinder 88, which may or may not cause the outrigger sections 20 and 22 to slide off the horizontal supports 124, and then swing the outrigger sections into the position shown in FIG. 2 where the members 104 are then resecured. Retraction of the cylinder 88 will then place the conditioner in its normal ground-working position.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An implement carrier comprising: an implement supporting frame having a transversely extending center section and a pair of outrigger sections, means mounting said frame for pivotal movement about a transverse axis from a lowered generally horizontal ground-working position to an upwardly and rearwardly extending transport position, and hinge means interconnecting the outrigger sections with the center section for upward swinging movement of the outrigger sections relative to the center section about generally horizontal forwardly diverging axes when the frame is in its lowered position and for forward folding movement of the outrigger sections relative to the center section from their upwardly and rearwardly extending positions when the center section is in its transport position.

2. An implement carrier comprising: a transversely extending implement supporting frame having a center section and a pair of outrigger sections, a draft frame securable to a propelling vehicle, means interconnecting said implement supporting frame to said draft frame for movement about a transverse axis from a lowered ground-working position to an upwardly and rearwardly extending transport position, extensible and retractable power means interconnecting said draft frame with said implement supporting frame and operable when moved in one direction to cause said frame to move between its lowered ground-working position and its upwardly and rearwardly extending transport position, and hinge means interconnecting the outrigger sections with the center section for upward swinging movement of the outrigger sections relative to the center section about forwardly diverging axes when the frame is in its lowered position and for forward movement of the outrigger sections relative to the center section from their upwardly and rearwardly extending position when the center section is in its transport position to a normal folded position, movement of the power means in the other direction causing the outrigger sections to raise and fold inwardly from their normal folded position an additional amount to their fully folded transport position.

3. The implement carrier set forth in claim 2 in which said draft frame includes a longitudinally extending draft beam securable at its forward end to a propelling vehicle, and a pair of forwardly converging members secured at their forward ends to an intermediate portion of said draft bar, the rear ends of said pair of members being pivotally secured to spaced apart portions of said implement supporting frame about a transverse axis.

4. The implement carrier set forth in claim 3 in which transport supports are provided on the forwardly converging members, said supports having a generally horizontal extending member to support the outriggers in their raised fully folded transport position and a depending stop member on the outer end of said horizontally extending members to limit inward movement of the outriggers prior to being raised to their fully folded transport position.

5. The implement carrier set forth in claim 4 in which said transport supports are provided with a hook to limit the upward movement of the outrigger sections when said power means is moved in its other direction.

References Cited

UNITED STATES PATENTS

| | | | |
|---|---|---|---|
| 402,670 | 5/1889 | Hewitt | 172—456 |
| 2,944,615 | 7/1960 | Clark | 172—456 |
| 2,970,658 | 2/1961 | Kopaska | 172—456 |
| 3,014,540 | 12/1961 | Youngberg | 172—311 X |
| 3,021,908 | 2/1962 | Dlugosch | 172—456 X |
| 3,033,296 | 5/1962 | Kaufman et al. | 172—456 X |
| 3,154,151 | 10/1964 | Zimmer et al. | 172—456 |
| 3,308,891 | 3/1967 | Jackson | 172—456 |
| 3,327,787 | 6/1967 | Adee | 172—456 X |
| 3,337,242 | 8/1967 | Richardson | 172—311 X |

ROBERT E. BAGWILL, Primary Examiner

ALAN E. KOPECKI, Assistant Examiner

U.S. Cl. X.R.

172—311